May 23, 1933.  W. G. COLES  1,910,752
SIGHT FEED INDICATOR
Filed Sept. 3, 1932
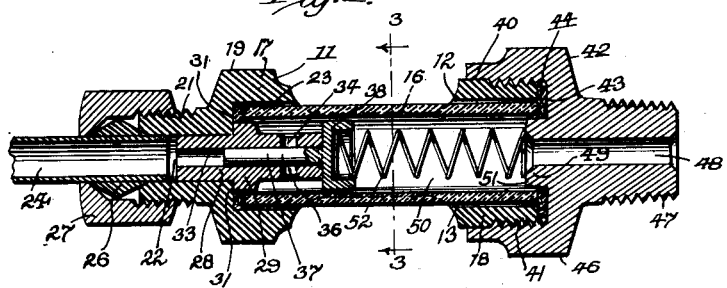
Inventor
Wilfred G. Coles
By
Attorneys.

Patented May 23, 1933

1,910,752

UNITED STATES PATENT OFFICE

WILFRED G. COLES, OF MADISON, WISCONSIN, ASSIGNOR TO MADISON-KIPP CORPORATION OF MADISON, WISCONSIN, A CORPORATION OF WISCONSIN

SIGHT FEED INDICATOR

Application filed September 3, 1932. Serial No. 631,717.

This invention relates to sight feed indicators, and particularly to such devices adapted for use with force feed lubricating apparatus to indicate the flow or lack of flow of oil through the system.

It is the primary purpose of the invention to furnish a sight feed indicator in which the flow indicating movements of the indicator element of the device are quite definite and readily observed by the attendant. Although particularly designed for use with lubricating apparatus of the solid oil, impulse type, use of the device with lubricating apparatus of the air and oil delivery type or with continuous flow lubricating apparatus is contemplated. The device is peculiarly adapted to indicate accurately the flow impulses of the lubricant stream in the first-mentioned type of apparatus, irrespective of whether these impulses occur rapidly or at relatively long intervals.

Definite indication of the flow of small quantities of lubricant, even to the extent of passage of a single drop therethrough, is an important feature of the device. The indicator operates equally well irrespective of the kind of lubricant used in the apparatus, while the indicator element is clearly visible under all conditions to show whether or not the apparatus is working properly.

A further purpose of the invention is to furnish a flow indicator of compact form which may be readily inserted in any type of lubricating system so as to form a unitary part thereof. The moving parts of the indicator are completely enclosed within the device, thereby precluding possible leakage. Inclusion of only a minimum number of parts in the construction considerably facilitates manufacture.

Other features and objects of the invention will appear from the detailed description below taken in conjunction with the accompanying drawing, in which:—

Fig. 1 is a longitudinal sectional view, greatly enlarged, of the preferred form of the feed indicator with the indicator plunger in the extreme left hand position which it assumes when there is no lubricant flowing through the device;

Fig. 2 is a like view with the indicator plunger in the extreme right hand position which it assumes when lubricant is flowing properly through the indicator;

Fig. 3 is a section on line 3—3 of Fig. 1 looking in the direction of the arrows;

Fig. 4 is a perspective view of the indicator plunger removed from the device;

Fig. 5 is a sectional view, similar to Fig. 1, of another form of the device, the parts being shown in the fluid-flowing position of Fig. 2; and Fig. 6 is a perspective of the somewhat different form of indicator plunger appearing in the device of Fig. 5.

In the sight feed indicator construction of Figs. 1–4, inclusive, 11 represents the tubular metal body of the indicator. Indicator body 11 is provided with diametrically opposed openings 12, 13, thus forming elongated side portions 14, 16 rigidly connecting tubular end portions 17, 18 to each other. Body end portion 17 is faceted at 19 for engagement by a suitable tool in assembling the device, as explained later. End portion 17 also is formed with an external, threaded boss 21 through which extends a reduced passageway 22 opening centrally into chamber 23 of the tubular indicator body 11.

Secured in the outer end of passageway 22 is one end of a tube 24 through which the lubricant flows from the source of supply, generally, a force feed lubricator of the impulse type, into the flow indicator, and thence to the part or parts to be lubricated. Near its end, tube 24 is provided with a fixed, annular bead 26 preferably in the form of an oppositely tapered collar, with which engages an internally threaded, flanged nut 27 mounted on boss 21. The outer end of passageway 22 is slightly countersunk so that, by screwing up nut 27, bead 26 is forced into firm contact with body end portion 17 and all possibility of leakage is prevented at this point. Tightly secured in the inner end of passageway 22, preferably by a press fit, is a ported sleeve or valve body member 28 through which the lubricant is adapted to flow into the indicator proper. Between its ends, sleeve 28 is formed with an annular flange 29 which abuts an annular seat 31 formed within body end portion 17 at the juncture of chamber 23 in the body and reduced passageway 22. Seat 31 not only limits the inward movement of sleeve 28 in assembling the device, but also serves to receive an annular cork or other gasket 32 which encircles sleeve 28.

Central bore 33 of sleeve 28 opens, near its inner end, onto the periphery of the sleeve by way of a pair of transverse, aligned ports 34, 36. Slidably mounted in bore 33 of sleeve 28 is the stem 37 of an indicator element or plunger 38. The details of construction of indicator plunger 38 appear clearly in Fig. 4 where the plunger is shown removed from the indicator device.

A glass tube 39 is mounted in indicator body 11 with the inner end of the glass tube bearing against gasket 32. Glass tube 39 encloses ported sleeve 28 and plunger 38, there being sufficient clearance provided between the glass tube and the plunger head so as to permit free passage of lubricant past the head and thus not interfere with the reciprocatory movements of the plunger, as explained later.

Body end portion 18 is threaded at 41 to receive a tubular connector 42 having an internally threaded recess 40. Connector 42 is also formed with an annular seat 43 at the inner end of recess 40 on which is located a second annular cork or other gasket 44. Facets 46 are provided on connector 42 whereby the latter may be screwed up on indicator body 11 so as to force gasket 44 into tight contact with the outer end of glass tube 39, and the inner end of the glass tube into close contact with gasket 32 and its seat 31. In this manner there is prevented all possibility of leakage of lubricant from the indicator proper.

Tubular connector 42 is provided with an externally threaded boss 47 whereby the connector may be screwed directly into the bearing or other part to be lubricated. A reduced passageway 48 extends through connector 42 and its boss, and its inner end opens centrally into recess 40 formed in the body of the connector. An annular, axially-extending flange 49, surrounding the inner end of reduced passage 48, projects through gasket 44 and thus serves to retain the gasket in place on its seat. Flange 49 also extends into the end of glass tube 39, the inner end 51 of flange 49 functioning as a seat for the outer end of the coil spring 52. The inner end of coil spring 52 is seated in the socket or cup-shaped head of plunger 38. Spring 52, having been placed in position under tension, will serve, unless lubricant is flowing through the indicator, to force plunger 38 to the left and against the inner end of ported sleeve 28, as shown in Fig. 1. This, as stated, is the normal, inactive position of the indicator element.

Plunger stem 37 is not closely fitted into bore 33 of sleeve 28 so as to act as a seal to the passage of lubricant therethrough. It is intended that the fit between these parts be close enough to prevent passage of as small a quantity as one drop of lubricant without causing plunger 38 to move to the right sufficiently far to open ports 34, 36, as shown in Fig. 2, and also loose enough to permit lubricant to leak by stem 37 of the plunger when the latter is returned by spring 52 to the normal position of Fig. 1, as explained in detail hereinafter.

In describing the operation of the device it will be assumed that the force feed lubricator mechanism connected to tube 24 has been operating and tube 24 and all of the chambers and passageways of the flow indicator, including passageway 48 communicating with the part to be lubricated, are full of lubricant; also that indicator plunger 38 is in its inactive position of Fig. 1.

If pressure is not applied to the column of lubricant to the left of plunger stem 37 so as to cause the lubricant to flow towards the right, coil spring 52 will maintain plunger 38 in this inactive position to indicate that the lubricant is not flowing. The position of plunger 38 in glass tube 39 may be readily observed through either opening 12 or 13 of body 11. However, in order to increase its visibility, the peripheral surface of the metal plunger head is given a bright finish. Thus it is made certain that the relative position of the plunger in glass tube 39 may be seen, notwithstanding the intervening film of lubricant between the plunger head and side of the glass tube.

When pressure is applied to the column of lubricant to the left of plunger stem 37, as for instance by means of a feed impulse imparted thereto by the force feed lubricator, the lubricant column acts against stem 37 to force it towards the right against the resistance of coil spring 52. As the flow impulse continues, plunger stem 37 is moved sufficiently to the right to uncover outlet ports 34, 36, and thereby permit free passage of the lubricant into chamber 50 of glass tube 39. At the same time, plunger head 38 moves to the right to give a definite indication to the attendant that the lubricant column is moving and a charge of lubricant is being fed forward through the system to the part to be lubricated. It will be noted that in the position of Fig. 2, the portion of sleeve 28 to the right of ports 34, 36 forms a support or guide, which insures proper return movement of the plunger by spring 52.

It has been stated that the fit between plunger stem 37 and bore 33 is somewhat free so as to permit the return movement of the indicator plunger to the left after the feed impulse has ceased. The relative looseness of fit between these parts in no wise interferes with the efficiency of the device in moving the plunger to the right to indicate a flow impulse, even though only a single drop of lubricant is fed therethrough, because the feed impulse imparted to the lubricant column or the momentary flow of the column is comparatively rapid. As a result, the moving column of lubricant serves to force the indicator plunger to the right to open ports 34, 36 before any appreciable leakage of lubricant can occur between stem 37 and bore 33 and out through the ports 34, 36. It is also believed that the cohesive action between stem 37 and the lubricant tending to escape between the stem and sleeve 28 aids in the movement of the plunger to open ports 34, 36.

As soon as stem 37 moves sufficiently to the right to open ports 34, 36, even partially, the released lubricant flowing from ports 34, 36 acts against the under face of the head of plunger 38 and aids in the rapid movement of the plunger stem to the fully open or active position of Fig. 2. The clearance between the peripheral surface of plunger head 38 and the inside of glass tube 39, as stated, is designed to permit the lubricant to pass freely by the plunger head and thus prevent any interference with the reciprocatory flow indicating movements of the plunger. At the same time, this clearance is reduced to a minimum, commensurate with efficient operation of the device, in order to bring the periphery of plunger 38 as close as possible to the inner surface of the glass tube 39 and thereby render it clearly visible.

Upon cessation of the flow impulse in the lubricant column to the left of plunger stem 37, coil spring 52 functions to force plunger 38 to the left towards its normal, inactive position of Fig. 1. The return of plunger 38 to the left is comparatively slow and depends, of course, upon the strength of spring 52 and the rate of leakage of lubricant between plunger stem 37 and the bore of sleeve 28. Shortly after movement to the left from the position of Fig. 2, plunger stem 37 cuts off outlet ports 34, 36 and prevents the free passage of lubricant therethrough, the plunger then continuing its movement to the left under the influence of spring 52 until it reaches the normal, inactive position of Fig. 1. Due to the clearance between the head of plunger 38 and glass tube 39 and the loose fit between plunger stem 37 and the boore of sleeve 28, the operation of the device is, in effect, as though the plunger were floating in the column of lubricant, and were being intermittently moved back and forth to the left or right by the flow impulses and the action of coil spring 52, to indicate the passage of a charge of lubricant or the absence of any such flow in the lubricant column.

From the above description, it will be seen that as successive impulses are imparted to the lubricant column in tube 24 by the force feed apparatus (not shown), plunger 38 will be moved to the right to definitely indicate each flow impulse, the plunger being returned automatically by spring 52 after each flow indication so as to be in position to indicate the next flow impulse. Should there be no flow impulse through the device, the fact that the head of plunger 38 remains continuously in the normal, inactive position of Fig. 1 will serve as a signal to the attendant that lubricant is not flowing through the line. Hence, sleeve 28 functions as a ported valve body member, while plunger stem 37 acts as a valve adapted to prevent or permit the free passage of lubricant through ports 34, 36, depending upon whether stem 37 is in the inactive position of Fig. 1 or the active position of Fig. 2. It will be understood, however, that at no time is the flow of lubricant past stem 37 cut off.

In the operation of the device it is not essential that spring 52 function after each feed impulse indication to return the head of plunger 38 to the position of Fig. 1, with the under side of the plunger head against sleeve 28. It is merely necessary that stem 37 moves sufficiently to the left to obstruct the free passage of lubricant through ports 34, 36.

Figs. 5 and 6 show a modified form of the device which includes all of the essential elements of the preferred construction shown in Figs. 1-4, inclusive. Hence, in Figs. 5 and 6, parts corresponding to those of the construction of Figs. 1-4 are designated by like reference characters, except they are primed.

End portion 17' of body 11' in this construction is provided with a threaded boss 21' on which is mounted a flanged nut 27'. This nut, as in the preferred construction, engages an annular bead 26' on a tube 24' leading from the force feed lubricating apparatus, whereby the tube is tightly secured to the indicator body.

Indicator body portion 18' at the opposite end of the device is threaded to receive the tubular connector 42' having a reduced passage 48' extending therethrough and opening at its outer end through a threaded boss 47' formed on the connector.

In the construction of Figs. 5 and 6, instead of providing a separate ported sleeve member 28, as in the construction of Figs. 1-4, this member is formed as an integral, ported projection 28' on the inner face of indicator body portion 17', as appears in Fig. 5. Slidably mounted in reduced bore 33' extending through body portion 17' and projection 28′ is the stem 37′ of the indicator plunger 38′. In this form of the device the indicator plunger 38′, instead of being provided with a machined, cup-shaped head, as in the construction of Figs. 1–4, is made from a single piece of wire, one end of which is bent to form the plunger head. The details of construction of this form of plunger 38′ appear clearly in Fig. 6, wherein the plunger is shown removed from the flow indicator.

Stem 37′ is loosely fitted into bore 33′ of projection 28′ similarly to the arrangement of the corresponding parts in the preferred form of the device in Figs. 1–4, and, to all intents and purposes, the operation of both forms of the device is the same. The bent wire type of plunger 38′ is cheaper to manufacture, and, because of the construction of the head, offers less resistance to the flow of lubricant through the indicator.

Similarly to the construction of Figs. 1–4, that of Figs. 5 and 6 includes cork or other gaskets 32′, 44′ located in body end portions 17′, 18′ and against which the ends of glass tube 39′ bear firmly to prevent possible leakage of lubricant from the indicator chamber 50′.

It will be noted that in Fig. 5 the right hand end of the device is provided with a compression fitting similar to that at the opposite end of the device. This fitting comprises flanged nut 53 mounted on threaded boss 47′ and engaging with an annular bead 54 on a tube 56, whereby the latter is tightly secured in communication with the outer end of reduced passageway 48′. With this arrangement the flow indicator may be placed anywhere in the feed line, instead of directly on the part to be lubricated, as is intended with the construction of Figs. 1–4.

The sight feed indicator of the present invention has been described as particularly adapted for use with force feed indicators of the solid oil, impulse type. Obviously, it also is adapted for efficient use as a lubricant feed indicator in various other types of lubricating systems. It may be used in the air and oil delivery type of system, in which case its operation is substantially the same as in the solid oil, impulse type, or it may be used with a continuous flow lubricator. It is obvious that in the application of the device last mentioned, as long as lubricant is flowing through the system, indicator plunger 38 will remain in the flow indicating position of Fig. 2. However, as soon as the flow of lubricant ceases, spring 52 will return the indicator plunger to the position of Fig. 1 to indicate that lubricant is not being delivered through the line.

While two practical embodiments of the device have been illustrated and described, and their adaptability for indicating the flow of lubricants particularly set forth, it is not intended to limit the invention to the details of these constructions, nor to restrict the use of the device to lubricant feeders. The device may be used to indicate efficiently the flow of various fluids other than lubricants. Obviously, numerous changes may be made in the construction of the indicator without departing from the scope of the invention, except as the same may be limited by the appended claims.

What is claimed is:—

1. The combination in an indicator of the type described of a fluid conductor having an inlet portion and an adjoining outlet portion, said inlet portion being provided with a passageway leading to said outlet portion; and a constantly observable indicator element arranged for substantial movement entirely within said conductor to indicate the flow of fluid through said passageway from the inlet portion of the conductor into the outlet portion thereof, said element having an actuating portion of uniform cross section slidably mounted in said inlet portion to normally cover the inner end of the passageway and extend a substantial distance therebeyond, said actuating portion being adapted, upon application of fluid pressure to its inner end, to move to permit free flow of fluid through said passageway into the outlet portion of the conductor.

2. The combination of claim 1 further characterized in that a section of the outlet portion of the conductor is of glass, while the actuating portion of the indicator element is in the form of a stem to which is connected a metal cylindrical head having a polished peripheral surface arranged adjacent the inner surface of the glass section, whereby the movements of the indicator element may be readily observed.

3. An indicator element for indicators of the type described comprising an actuating stem and an indicating head formed from a single piece of twisted wire.

4. An indicator element for indicators of the type described comprising an actuating stem and an indicating head, said head being formed to permit flow of fluid therethrough.

5. In an indicator of the character described, the combination of a fluid conductor; and an indicator element arranged entirely therein for reciprocatory movement to indicate the flow or lack of flow of fluid through the conductor, said element comprising an indicating head disposed in the fluid stream and an actuating stem adapted to control the ready flow of fluid through the conductor.

6. The combination of claim 5 further characterized in that the entire indicating element is disposed in the fluid stream and that said indicating head is arranged for movement axially of the fluid conductor within a transparent section thereof.

7. In a flow indicator of the type described, the combination of a fluid conductor comprising an inlet portion and an outlet portion, said inlet portion including a glass tube immediately adjoining the inlet portion; a tubular extension of the inlet portion projecting into said glass tube and provided with a plurality of transverse passages running from the bore of said tubular extension to its outer surface and through which fluid is adapted to pass from the inlet portion to the outlet portion of the conductor; a reciprocable indicator element having an indicating head located in the glass tube and an actuating stem extending into the bore of said extension so as normally to close said passages; and a spring in the glass tube urging said element towards normal position, but adapted to yield, upon application of fluid pressure to the inner end of the actuating stem, to permit movement of the stem to uncover said passages and allow free passage of fluid from the inlet portion into the outlet portion of the conductor.

8. The combination in an indicator body of the type described of a fluid conductor having an inlet portion and an adjoining outlet portion into which a ported tubular extension of said inlet portion projects; and an indicator element arranged for movement in said conductor to indicate the passage of fluid from the inlet portion of the conductor into the outlet portion thereof, said element having an actuating portion slidably mounted in the tubular extension and normally lapping said port to prevent passage of fluid from said inlet portion of the conductor into the outlet portion, said actuating portion being adapted, upon application of fluid pressure to its inner end, to move to uncover said port and permit free passage of fluid into the outlet portion of the conductor.

9. The combination of claim 8 further characterized in that the section of the outlet portion of the conductor adjacent the inlet portion thereof is a transparent tube and the indicator element is provided with a head, the movements of which may be observed through said tube.

10. The combination in an indicator of the type described of a fluid conductor having an inlet portion adapted to be completely filled with a fluid and an adjoining outlet portion; and an indicator element arranged for substantial movement in said conductor to indicate the passage of any quantity of fluid from said inlet portion to the outlet portion of the conductor, said element having an actuating portion of uniform cross section adapted to move a substantial distance into and out of the inlet portion of the conductor and thereby intermittently interrupt and establish free communication between said inlet and outlet portions, the fit between the actuating portion of the indicator element and the inlet portion of the conductor being sufficiently tight to cause actuation of said element to establish free communication between said inlet and outlet portions in order to permit passage of as small a quantity as a single drop of fluid from the inlet portion to the outlet portion of the conductor, said fit also being non-sealing and sufficiently free to permit return movement of the indicator element, notwithstanding the presence of fluid in the inlet portion of the conductor, to interrupt free communication between said portions of the conductor.

11. The combination of claim 10 further characterized in that said outlet portion of the conductor includes a transparent section within which the flow indicator element is disposed in the fluid stream and through which the movements of the flow indicator element may be observed, and there is a spring in the fluid conductor for effecting the return movements of the indicator element.

In testimony whereof I have signed my name to this specification.

WILFRED G. COLES.